US012632565B2

(12) United States Patent
Kar et al.

(10) Patent No.: US 12,632,565 B2
(45) Date of Patent: May 19, 2026

(54) METHOD AND SYSTEM FOR ASSESSING RISK ASSOCIATED WITH AI MODELS

(71) Applicant: ZENSAR TECHNOLOGIES LTD., Pune (IN)

(72) Inventors: Indrajit Kar, Pune (IN); Zonunfeli Ralte, Pune (IN); Varsha Gupta, Pune (IN); Ankush Rathore, Pune (IN)

(73) Assignee: ZENSAR TECHNOLOGIES LTD., Pune (IN)

( * ) Notice: Subject to any disclaimer, the term of this patent is extended or adjusted under 35 U.S.C. 154(b) by 42 days.

(21) Appl. No.: 18/606,839

(22) Filed: Mar. 15, 2024

(65) Prior Publication Data

US 2025/0291931 A1     Sep. 18, 2025

(51) Int. Cl.
G06F 21/57 (2013.01)

(52) U.S. Cl.
CPC ...... G06F 21/577 (2013.01); G06F 2221/033 (2013.01)

(58) Field of Classification Search
CPC ...................... G06F 21/577; G06F 2221/033
See application file for complete search history.

(56) References Cited

U.S. PATENT DOCUMENTS

| | | |
|---|---|---|
| 2020/0265356 A1 | 8/2020 | Lee et al. |
| 2022/0036221 A1 | 2/2022 | Hargras et al. |
| 2024/0275809 A1 * | 8/2024 | Glas .................... H04L 63/1416 |
| 2025/0054068 A1 * | 2/2025 | Arriaga ................. G06N 3/045 |
| 2025/0233884 A1 * | 7/2025 | Sherr Lurie ........ H04L 63/1433 |
| 2025/0238609 A1 * | 7/2025 | Weathers ............. G06F 16/383 |

OTHER PUBLICATIONS

IBM, "Artificial intelligence (AI) solutions", Available online at least as early as Dec. 21, 2023 at: https://www.ibm.com/artificial-intelligenceutm_content=SRCWW&p1=Search&p4=43700077827236883&p5=p&gclid=CjwKCAiAvoqsBhB9EiwA9XTWGQLcZIcSbmiSFktZu1N1XM_X1cZ_65SukHL_pwDwNQ5MLv0nCgSOJBoCaVIQAvD_BwE&gclsrc=aw.ds (9 pages).

(Continued)

*Primary Examiner* — Meng Li
(74) *Attorney, Agent, or Firm* — HSML P.C.

(57) ABSTRACT

Methods and systems for assessing risk associated with Artificial Intelligence (AI) models are provided. The method includes receiving a risk parameter among a plurality of risk parameters used for assessing an AI model, from a user associated with the AI model. Further, the method includes generating a preset questionnaire including a plurality of questions corresponding to the risk parameter. Furthermore, the method includes receiving user response data and corresponding evidence data against each of the plurality of questions from the user. The user response data is validated by correlating the user response data with the corresponding evidence data. The validated user response data is compared with preset response data corresponding to each of the plurality of questions. Thereafter, the method includes generating a report including a risk score indicating a risk associated with the AI model corresponding to the risk parameter, using a learning model, based on the comparison.

12 Claims, 12 Drawing Sheets

100

102

(56)            References Cited

OTHER PUBLICATIONS

Kanev et al., "Responsible AI: How to make your enterprise ethical, so that yourAI is too", Available online at least as early as Dec. 21, 2023 at: https://dxc.com/in/en/insights/perspectives/paper/responsible-ai (13 pages).

PWC, "AI is bringing limitless potential to push US forward as a society—but with great potential comes great risks.", Available online at least as early as Dec. 21, 2023 at: https://www.pwc.com/gx/en/issues/data-and-analytics/artificial-intelligence/what-is-responsible-ai.html (8 pages).

Coforge, "Coforge launchesQuasar Responsible AI", Available online at: https://www.coforge.com/news-events/news/coforge-launches-quasar-responsible-ai, Dec. 11, 2023 (4 pages).

* cited by examiner

100

102

COMPUTING SYSTEM
106

REPORT COMPRISING
RISK SCORE

108

AI MODEL 104

1. _ _ _ _ _ _
2. _ _ _ _ _ _
3. _ _ _ _ _ _
4. _ _ _ _ _ _
5. _ _ _ _ _ _

200

300

COMPUTING SYSTEM 106

MEMORY 206
(ONE OR MORE INSTRUCTIONS)

UNITS 302

INPUT UNIT 304

QUESTIONNAIRE GENERATION UNIT 306

VALIDATION UNIT 308

COMPARISON UNIT 310

REPORT GENERATION UNIT 312

OTHER UNITS 314

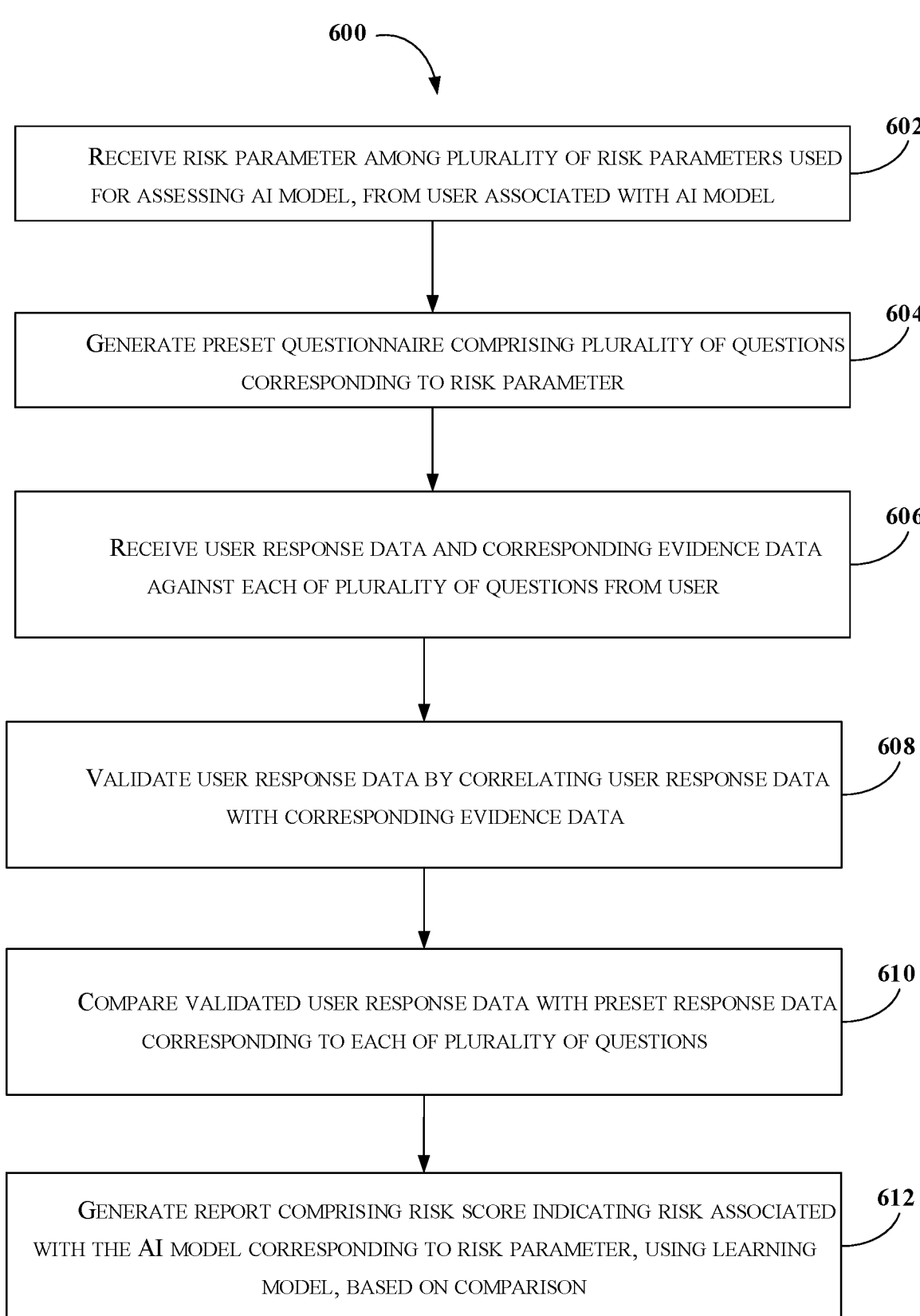

602

RECEIVE RISK PARAMETER AMONG PLURALITY OF RISK PARAMETERS USED FOR ASSESSING AI MODEL, FROM USER ASSOCIATED WITH AI MODEL

604

GENERATE PRESET QUESTIONNAIRE COMPRISING PLURALITY OF QUESTIONS CORRESPONDING TO RISK PARAMETER

606

RECEIVE USER RESPONSE DATA AND CORRESPONDING EVIDENCE DATA AGAINST EACH OF PLURALITY OF QUESTIONS FROM USER

608

VALIDATE USER RESPONSE DATA BY CORRELATING USER RESPONSE DATA WITH CORRESPONDING EVIDENCE DATA

610

COMPARE VALIDATED USER RESPONSE DATA WITH PRESET RESPONSE DATA CORRESPONDING TO EACH OF PLURALITY OF QUESTIONS

612

GENERATE REPORT COMPRISING RISK SCORE INDICATING RISK ASSOCIATED WITH THE AI MODEL CORRESPONDING TO RISK PARAMETER, USING LEARNING MODEL, BASED ON COMPARISON

FIGURE 6

METHOD AND SYSTEM FOR ASSESSING RISK ASSOCIATED WITH AI MODELS

TECHNICAL FIELD

The present disclosure generally relates to the field of Artificial Intelligence (AI). More particularly, the present disclosure relates to a method and a system for assessing risk associated with AI models.

BACKGROUND

Artificial intelligence (AI) is the simulation of human intelligence processes by machines, especially computer systems. AI applications are used in a wide variety of industries, including healthcare, finance, retail, manufacturing, education, and the like. While AI capabilities can enable limitless possibilities, there are various concerns raised about the best way to build fairness, interpretability, privacy, and safety into the AI systems. For instance, consider Generative AI (GenAI) which is a branch of AI that enables creating content (image, text, conversations, etc.). There is a possibility of creation of fake images/videos, generating biased outputs, inaccurate or meaningless content, or generation of biased outputs by GenAI models.

There are several challenges or risks associated with AI models. Such challenges may include bias and fairness challenges. For instance, the presence of biases in training data leads to biased AI models, causing unfair treatment to certain groups. Further, the AI models may lack transparency, making it difficult for users to understand specific decisions of the AI models. Also, the AI models developed may not adhere to evolving data privacy regulations, AI regulations, or governance requirements. In certain cases, the AI models are susceptible to adversarial attacks or lacks robustness in dynamic environments. Further, there is a difficulty in navigating ethical considerations and making ethical decisions while developing and deploying the AI models. Also, there are several concerns from the public regarding the societal impact and consequences of AI, leading to a lack of trust on the AI models. The current AI systems also lack ability to measure and mitigate the environmental impact of the AI models and related infrastructure. Further, there are challenges faced in fostering collaboration between technical and nontechnical teams, including legal, ethical, and business units, while developing and deploying the AI models. This leads to the development of the AI models that lack fairness, interpretability, privacy, safety, etc which creates problems such as wrong prediction from the AI models, biased outputs, adversarial attacks, data breach leading to leakage of sensitive data, etc.

These challenges need to be addressed to build and deploy responsible AI systems/models that are not only technically robust but also ethical, transparent, and aligned with societal values and regulations. The existing state of the field primarily involves manual assessments of risks associated with the AI systems, or in some cases, there is an absence of assessment mechanisms or assessors for assessing the risks associated with the AI systems.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method of assessing risk associated with Artificial Intelligence (AI) models. The method comprises receiving a risk parameter among a plurality of risk parameters used for assessing an AI model, from a user associated with the AI model. Further, the method comprises generating a preset questionnaire comprising a plurality of questions corresponding to the risk parameter. Furthermore, the method comprises receiving user response data and corresponding evidence data against each of the plurality of questions from the user. The user response data is validated by correlating the user response data with the corresponding evidence data. The validated user response data is compared with preset response data corresponding to each of the plurality of questions. Thereafter, the method comprises generating a report comprising a risk score indicating a risk associated with the AI model corresponding to the risk parameter, using a learning model, based on the comparison.

In an embodiment, the learning model is a Generative AI (GenAI) model.

In an embodiment, the validated user response data is compared with the preset response data by determining a distance metric between the validated user response data and the preset data response.

In an embodiment, one or more recommendations are generated corresponding to at least one risk among the plurality of risk parameters, based on respective risk scores.

In an embodiment, an adversarial attack is generated to assess the risk associated with the AI model. Further, an adversarial risk score corresponding to the adversarial attack is determined.

In an embodiment, the present disclosure discloses a computing system for assessing risk associated with Artificial Intelligence (AI) models. The computing system comprises at least one processor and a memory. The processor is configured to receive a risk parameter among a plurality of risk parameters used for assessing an AI model, from a user associated with the AI model. Further, the processor is configured to generate a preset questionnaire comprising a plurality of questions corresponding to the risk parameter. Furthermore, the processor is configured to receive user response data and corresponding evidence data against each of the plurality of questions from the user. The processor validates the user response data by correlating the user response data with the corresponding evidence data. The validated user response data is compared with preset response data corresponding to each of the plurality of questions. Thereafter, the processor is configured to generate a report comprising a risk score indicating a risk associated with the AI model corresponding to the risk parameter, using a learning model, based on the comparison.

In an embodiment, the present disclosure discloses a non-transitory computer readable media for assessing risk associated with Artificial Intelligence (AI) models. The non-transitory computer readable media comprises instructions, when executed by at least one processor, causes the processor to receive a risk parameter among a plurality of risk parameters used for assessing an AI model, from a user associated with the AI model. Further, the instructions cause the processor to generate a preset questionnaire comprising a plurality of questions corresponding to the risk parameter. Furthermore, the instructions cause the processor to receive user response data and corresponding evidence data against each of the plurality of questions from the user. The processor validates the user response data by correlating the user response data with the corresponding evidence data. The validated user response data is compared with preset response data corresponding to each of the plurality of questions. Thereafter, the instructions cause the processor to generate a report comprising a risk score indicating a risk associated with the AI model corresponding to the risk parameter, using a learning model, based on the comparison.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 7:
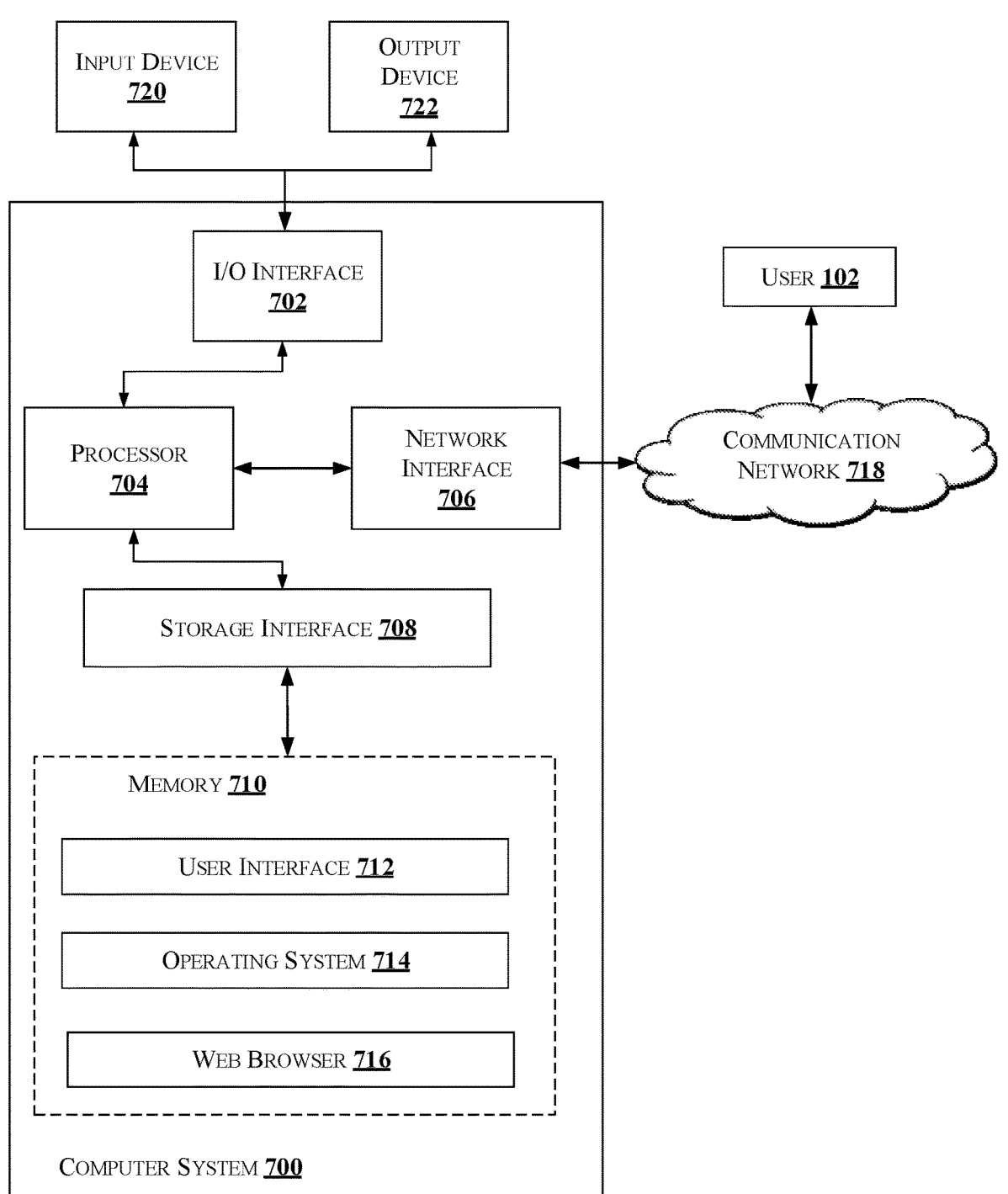

FIGS. 5A-5F show exemplary illustrations for assessing risk associated with the AI models, in accordance with some embodiments of the present disclosure FIG. 6 shows an exemplary flow chart illustrating method steps for assessing risk associated with the AI models, in accordance with some embodiments of the present disclosure; and FIG. 7 illustrates a block diagram of an exemplary computer system for implementing embodiments consistent with the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure provides methods and systems for assessing risk associated with Artificial Intelligence (AI) models. The present disclosure provides a system where a user associated with an AI model can assess risks associated with the AI model. The system of the present disclosure generates a set of questions corresponding to various risk parameters used for assessing the AI model. The user needs to provide response for each question along with necessary evidence data. The system validates the response by correlating the response with the evidence data. Once the response is validated, the system evaluates the response based on a preset response of the corresponding question. The system generates risk scores indicating risks associated with the AI models corresponding to various risk parameters. Also, the system of the present disclosure assesses the non-compliance of the AI models for various risk parameters based on the risk scores and provides recommendations/guidance or to lower the risk scores. Accordingly, the users associated with the AI models can take necessary mitigation measures to reduce risks associated with the AI models and develop a responsible AI model. The system of the present disclosure validates the response provided by the user based on the evidence data, and hence enables a robust assessment process of the AI models.

The present disclosure provides a structured approach to assess the AI models, ensuring fairness, privacy, security, and compliance. The system of the present disclosure empowers users associated with the AI models to identify biases, mitigate risks, ensure legal and ethical compliance, and optimize model performance. The framework of the present disclosure fosters transparency, enabling explainability and interpretability crucial for building trust in the AI models. By emphasizing continuous monitoring and improvement, the present disclosure enables resilient models that generalize well, minimizing harm, and aligning with evolving societal expectations. The system of the present disclosure enables development of the AI models that are robust against adversarial attacks. Also, the present disclosure facilitates informed decision making, fostering responsible AI development and deployment. The continuous monitoring of the AU model allows timely adaptations and improvements, enhancing overall model performance and alignment with evolving ethical and legal standards. The framework of the present disclosure enables organizations to build trustworthy AI systems, inspiring confidence, regulatory adherence, and societal benefit while minimizing potential risks.

Figure 1:
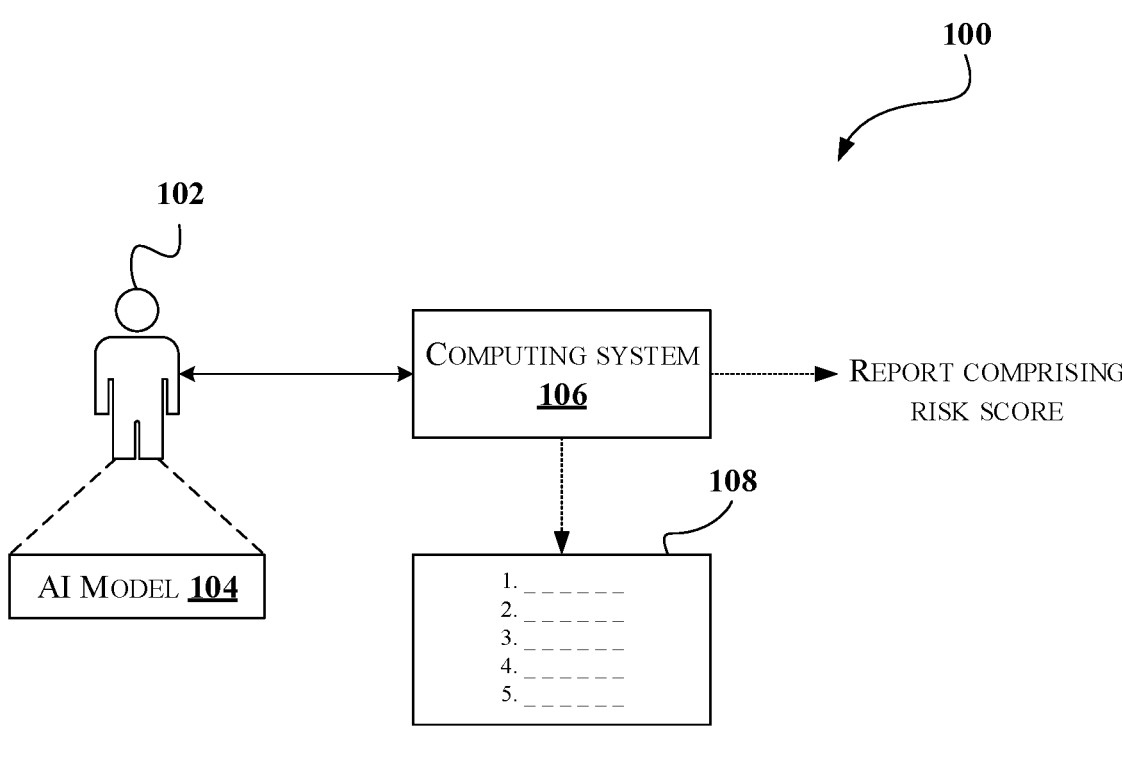
FIG. 1 illustrates an exemplary environment for assessing risk associated with Artificial Intelligence (AI) models, in accordance with some embodiments of the present disclosure.

FIG. 1 illustrates an exemplary environment 100 for assessing risk associated with AI models, in accordance with some embodiments of the present disclosure. The exemplary environment 100 comprises a user 102, an AI model 104, and a computing system 106. An AI model is a program that enables machines to analyze data, identify patterns, and make predictions or decisions. The AI model 104 may be, but not limited to, a machine learning model, a deep learning model such as a Generative AI (GenAI) model, or a Natural Language Processing (NLP) model. The development of the AI model 104 includes various phases, such as collect data for training the AI model 104, prepare training data, build the AI model 104 by training using the training data, test the AI model 104 using testing data, and deploy the AI model 104. There may be multiple users involved in development of the AI model 104. A single user 102 associated with the AI model 104 is shown in FIG. 1 for illustrative purpose only, and this should not be considered as limiting. The user 102 may be a technical person such as a data scientist, a domain expert etc., or a non-technical person such as a user associated with business, legal, or data regulatory team, a stakeholder, etc. The user 102 needs to ensure that the AI model 104 being developed and deployed is "responsible" i.e., the user 102 needs to ensure fairness, interpretability, privacy, safety, etc.

In the present disclosure, the computing system 106 is used to assess risks associated with the AI model 104 to ensure responsibleness of the AI model 104. Herein, the computing system 106 receives a risk parameter among a plurality of risk parameters used for assessing the AI model 104, from the user 102. The plurality of risk parameters may include, but not limited to, bias and fairness, privacy violations, security risks, model robustness, data collection and bias, accuracy and reliability, generalization, explainability, interpretability, adversarial attacks, robustness testing, legal compliance, liability assessment, and ethic assessment. The user 102 selects one of the plurality of risk parameters. For example, the user 102 may select privacy violations. The computing system 106 generates a preset questionnaire 108 including multiple questions corresponding to the selected risk parameter. For example, the computing system 106 may generate a first question as "How is sensitive or private information handled during training and inference stages?" and a second question as "Are there procedures in place to anonymize or de-identify sensitive data?".

The computing system 106 receives user response data and corresponding evidence data against each question. For example, the user response data corresponding to the first question may include "sensitive data is encrypted and access-controlled". The user 102 may provide snippets of encryption techniques employed in the AI systems as the evidence data. Further, the computing system 106 correlates the user response data with the corresponding evidence data, to validate the user response data. Once the user response data is validated, the computing system 106 compares the validated user response data with preset response data corresponding to each of the plurality of questions. For example, the preset response data corresponding to the first question may comprise encryption techniques that are typically used to encrypt the data. Then, the computing system 106 generates a report including risk scores corresponding to the plurality of risk parameters, using a learning model, based on the comparison. The risk scores indicate a risk associated with the AI model 104. Also, the computing system 106 generates one or more recommendations to lower the risk scores. The user 102 may take necessary mitigation measures, based on the one or more recommendations.

The computing system 106 may be a computing device such as, a laptop computer, a desktop computer, a Personal Computer (PC), a notebook, a smartphone, a tablet, e-book readers, a server, a network server, a cloud-based server, router, and the like.

Figure 2:
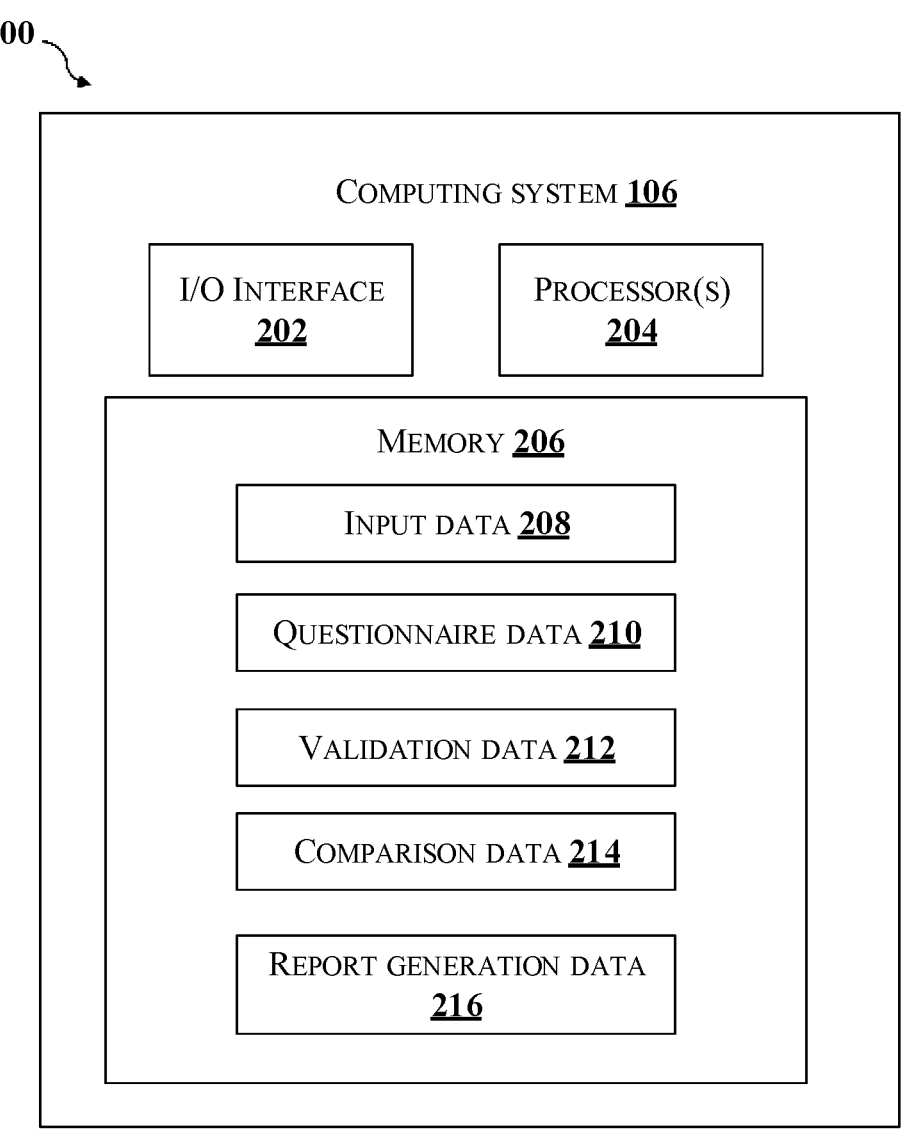
FIGS. 2 and 3 illustrate detailed diagrams of a computing system for assessing risk associated with the AI models, in accordance with some embodiments of the present disclosure.

FIG. 2 shows a detailed block diagram 200 illustrating the computing system 106, in accordance with some embodiments of the present disclosure. The computing system 106 may comprise an I/O interface 202, at least one processor 204, and a memory 206. The I/O interface 202 may be configured to communicate with the user 102. The memory 206 may be communicatively coupled to the at least one processor 204. The at least one processor 204 may be configured to perform one or more functions of the computing system 106 as described in the present disclosure.

In an embodiment, the at least one processor 204 is configured to receive a risk parameter among a plurality of risk parameters used for assessing the AI model 104. The at least one processor 204 may receive the risk parameter from the user 102 associated with the AI model 104, via the I/O interface 202. The plurality of risk parameters is used to assess the risk associated with the AI model 104. The plurality of risk parameters may include, but not limited to, bias and fairness, privacy violations, security risks, model robustness, data collection and bias, accuracy and reliability, generalization, explainability, interpretability, adversarial attacks, robustness testing, legal compliance, liability assessment, and ethic assessment. A person skilled in the art will appreciate that any parameter other than the above-mentioned risk parameters may be used to assess the risk associated with the AI model 104.

Figure 4:
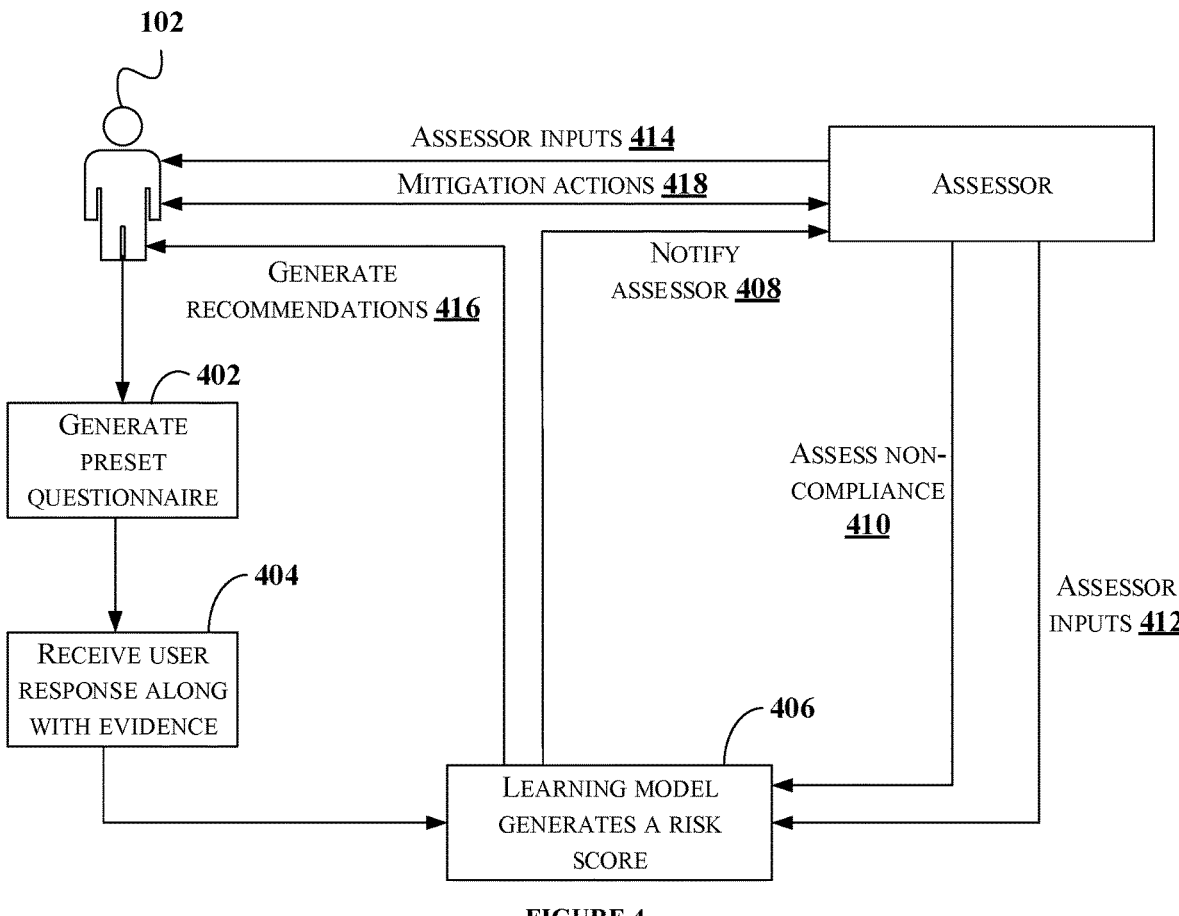
FIG. 4 shows an exemplary flow diagram for assessing risk associated with the AI models, in accordance with some embodiments of the present disclosure.
Figure 5A:
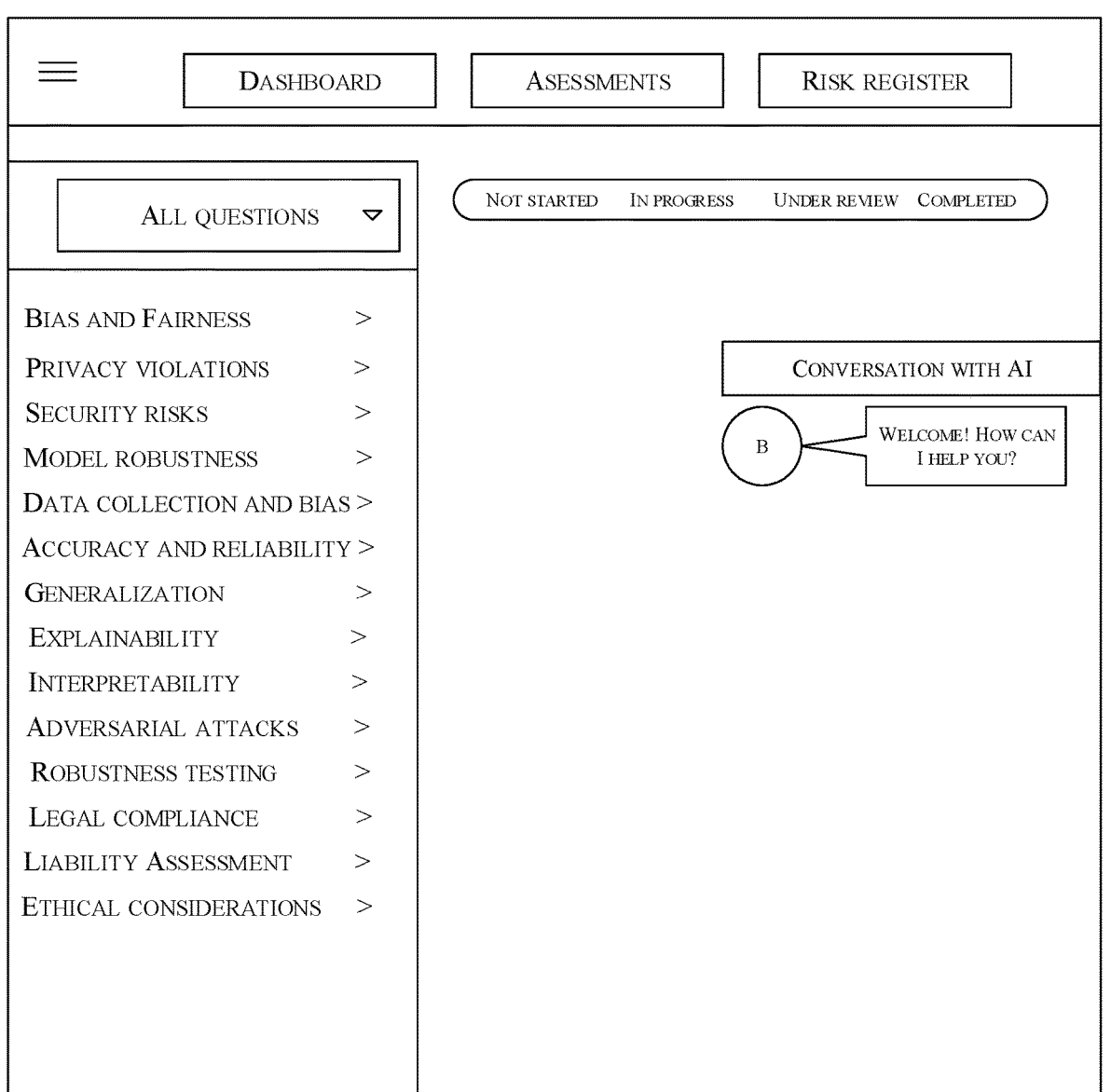
Figure 5B:
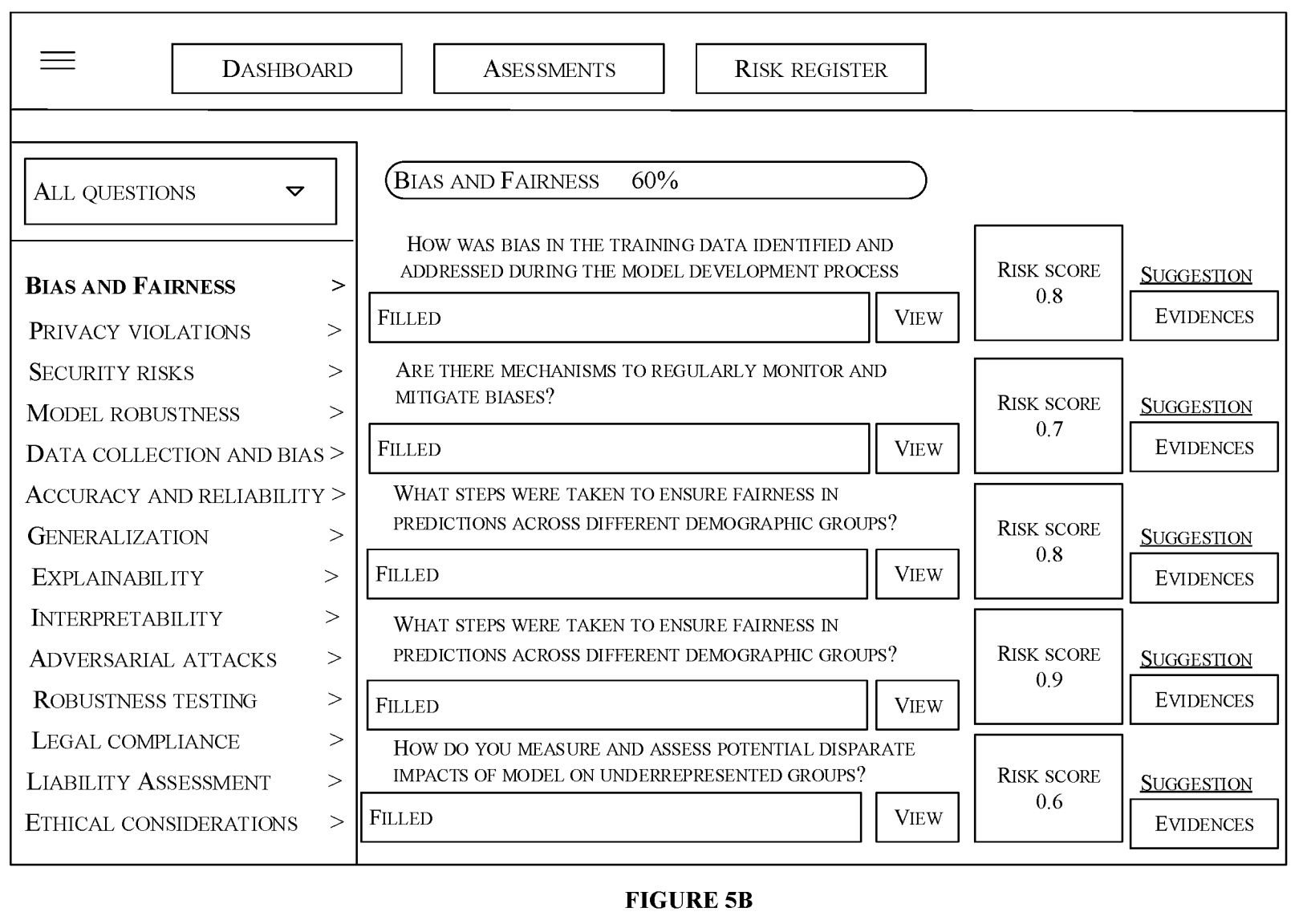

In an embodiment, the at least one processor 204 is configured to generate the plurality of risk parameters. For example, the at least one processor 204 may display a list of risk parameters on a user interface such as a display. The at least one processor 204 may receive a selection of a risk parameter from the plurality of risk parameters from the user 102. A person skilled in the art will appreciate that transmission of the plurality of risk parameters to the user 102 and receiving the selection of the risk parameter from the user 102 can be in any other form, and should not be considered as limiting. Referring to FIG. 4, the at least one processor 204 may receive the risk parameter from the user 102. Reference is made to FIG. 5A illustrating an exemplary illustration of a risk assessment system or a portal. As shown, the plurality of risk parameters may be displayed to the user 102. Referring to FIG. 5B, the at least one processor 204 may receive the risk parameter "bias and fairness".

Referring back to FIG. 2, in an embodiment, the at least one processor 204 is configured to generate a preset questionnaire comprising a plurality of questions corresponding to the risk parameter. The plurality of questions in the preset questionnaire may be pre-defined for each of the plurality of risk parameters based on analysis of the risks associated with the risk parameter on the AI model 104. For instance, consider that the risk parameter is "privacy violation". The misuse of sensitive data in the data provided during the training and inference stages may affect end users. Hence, the preset questionnaire including a question "How is sensitive or private information handled during the training and inference stages to prevent privacy violations?" may be pre-defined to avoid risks associated with transmission or misuse of the sensitive data. Referring again to FIG. 4, the at least one processor 204 may generate the preset questionnaire comprising the plurality of questions, at step 402. Referring again to FIG. 5B, the at least one processor 204 may generate the preset questionnaire comprising the plurality of questions corresponding to the risk parameter "bias and fairness". As shown, the plurality of questions may include a question "How was bias in the training data identified and addressed during the model development process?".

7

Figure 5C:
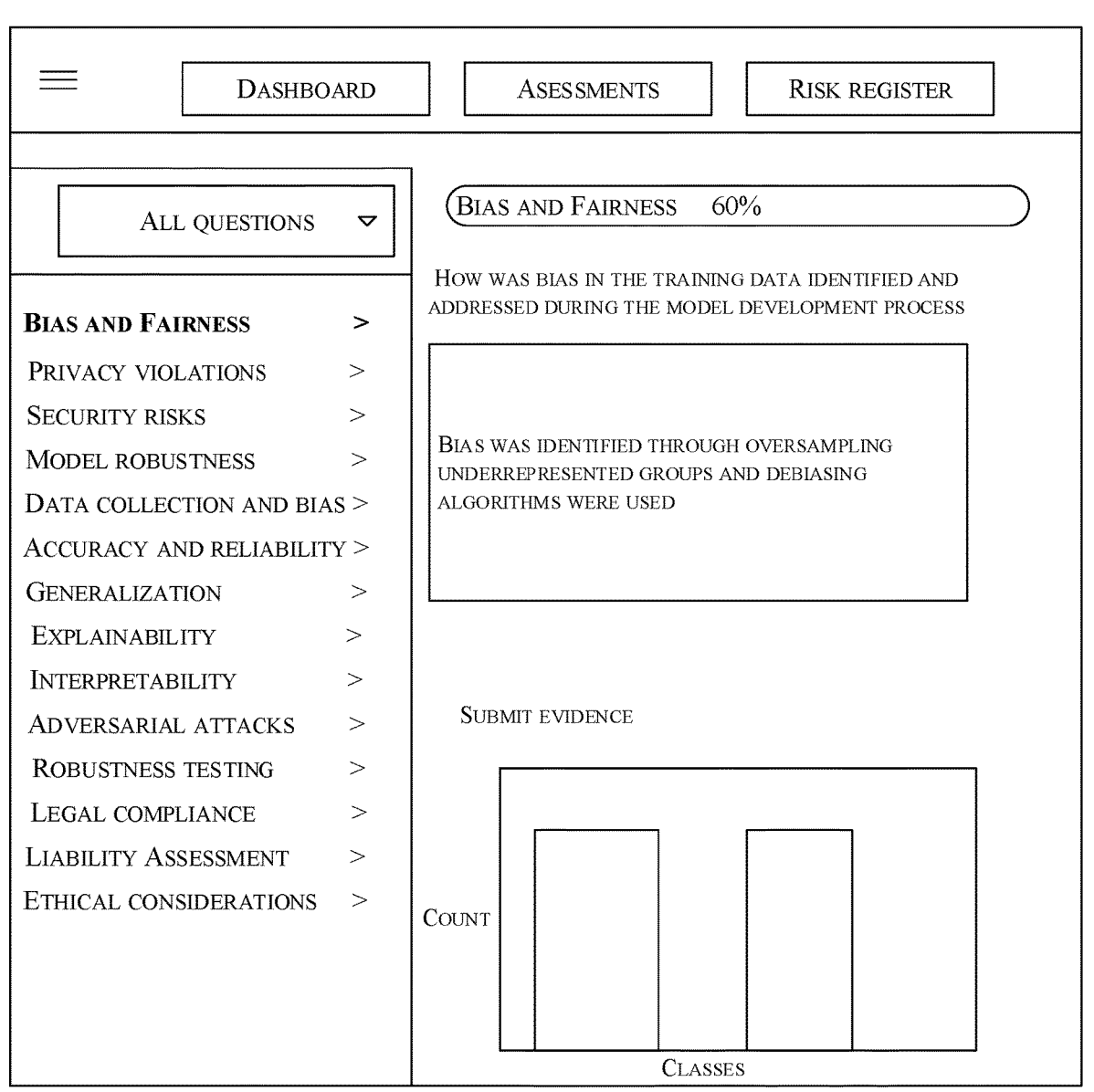
Figure 5D:
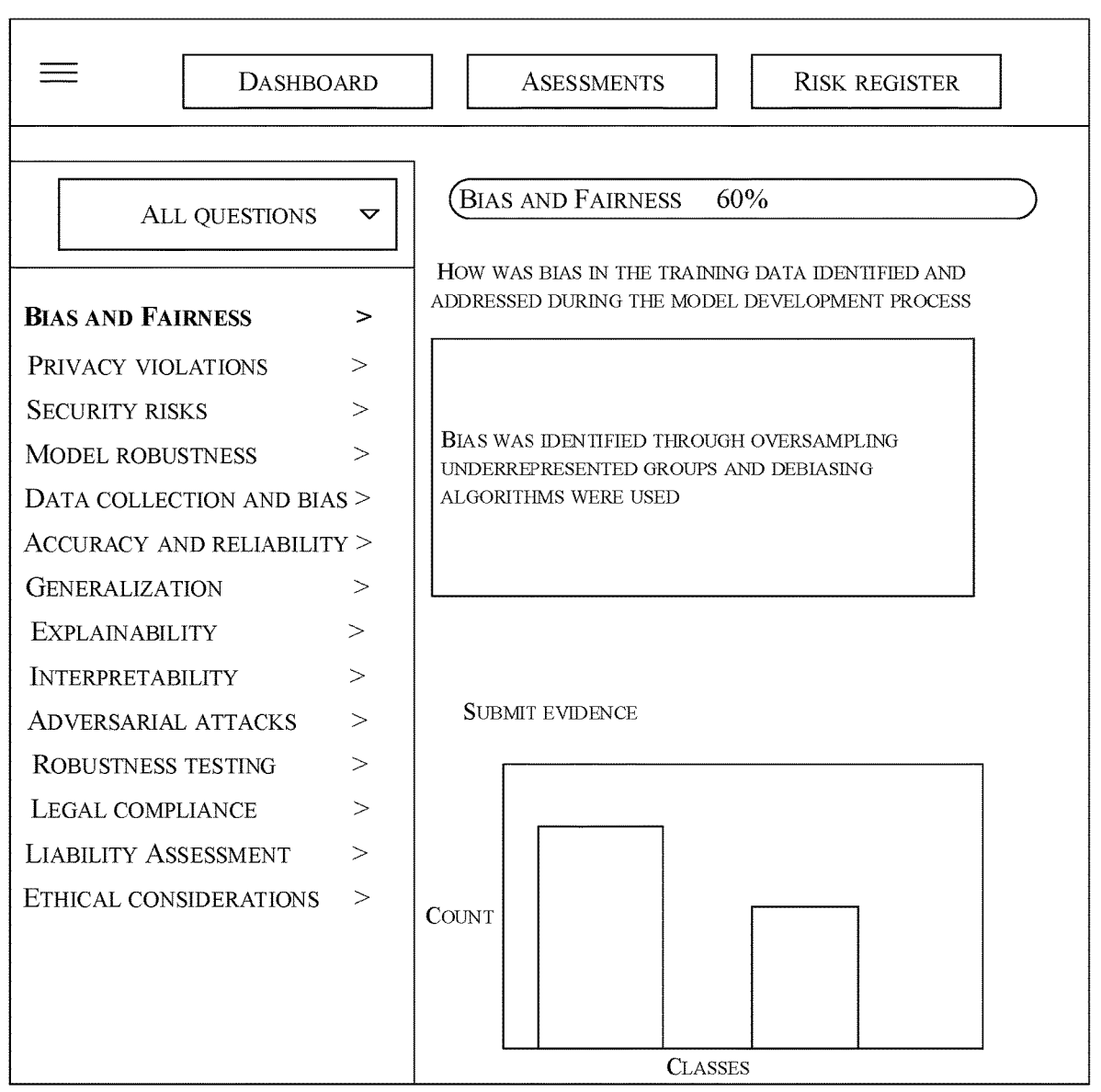

In an embodiment, the at least one processor 204 may be configured to receive user response data and corresponding evidence data against each of the plurality of questions from the user 102. The user response data may include a response from the user 102 for each of the plurality of questions. The evidence data be received to validate the user response data. The evidence data may be in form of text, images, videos, and the like. For example, the evidence data may include images of outputs of the AI model 104. In another example, the evidence data may include text document with code snippets of encryption techniques used for encrypting data associated with the AI model 104. In an embodiment, the at least one processor 204 may monitor receipt of the user response data and the corresponding evidence data from the user 102. Further, the at least one processor 204 may notify the user 102 to provide the user response data and/or the evidence data for the plurality of questions. For instance, the user 102 may have provided the user response data to a question. However, the user 102 may have not submitted necessary evidence. In such case, the at least one processor 204 may notify the user 102 to submit the evidence data. In another example, the user 102 may have provided the user response data for 60% questions. The at least one processor 204 may notify the user 102 to provide the user response data for remaining 40% questions. Referring again to FIG. 4, the at least one processor 204 receives the user response data along with the evidence data at step 404. FIGS. 5C and 5D illustrate the user response data and the evidence data provided by the user 102 corresponding to the question "How was bias in the training data identified and addressed during the model development process?". As shown, the user response data may include different techniques used to remove biasness from the training data. The evidence data may include an image illustrating a count of data items provided for different classes (example, male and female) as training data to the AI model 104. The user 102 may view the user response data and/or evidence data by selecting an option "view" as shown in FIG. 5B.

Figure 5E:
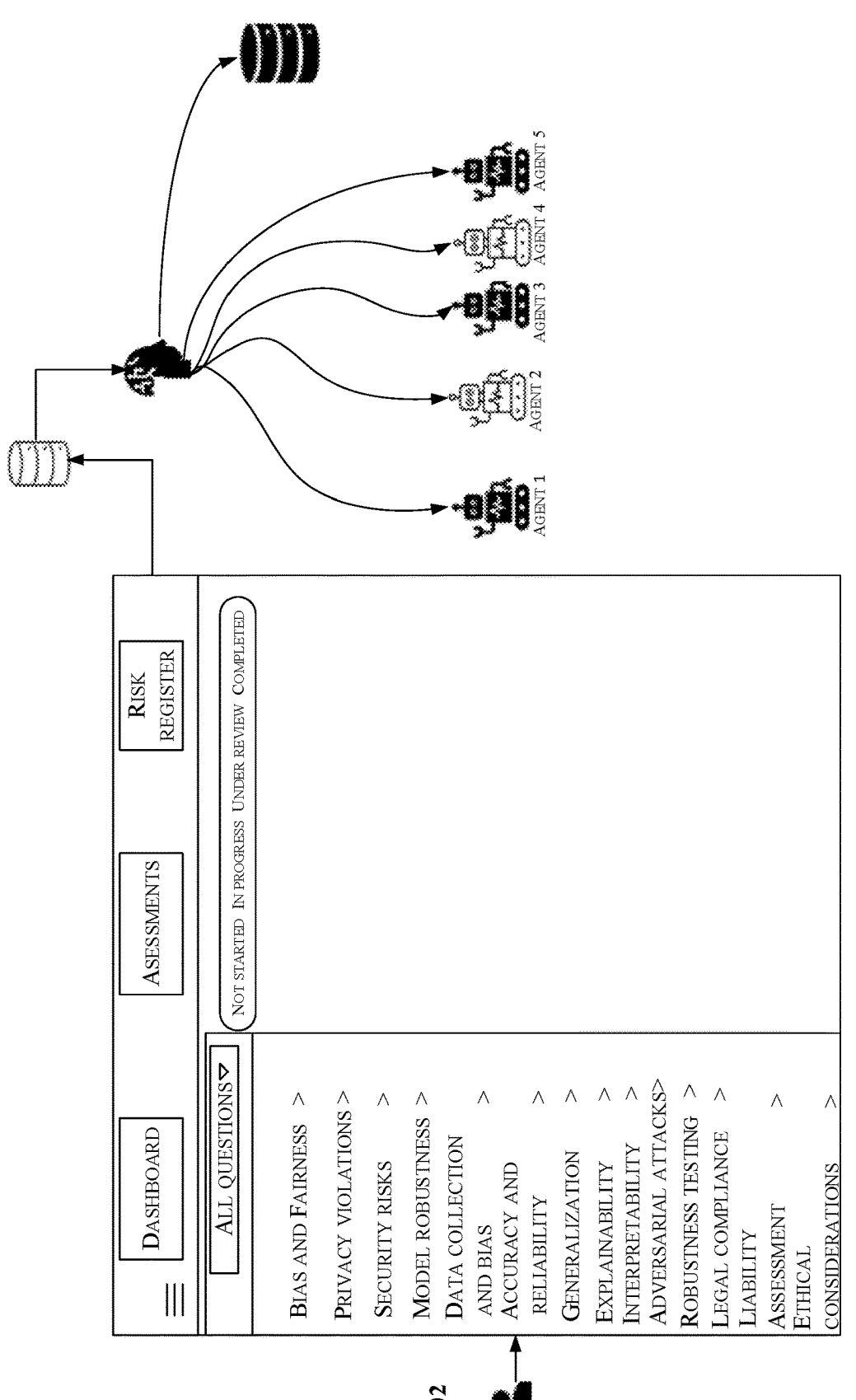

In an embodiment, the at least one processor 204 validates the user response data by correlating the user response data with the corresponding evidence data. The at least one processor 204 validates the user response data using a learning model. In an embodiment, the learning model may be a Generative AI (GenAI) model. The present description is explained considering the learning model as a GenAI model. A person skilled in the art will appreciate that any models other than the GenAI model may be used to validate the user response data. In an embodiment, a multi-agent system may be implemented and one or more GenAI agents may be used to perform processes of risk assessment of the AI model 104 as shown in FIG. 5E. A person skilled in the art will appreciate that a number of GenAI agents may vary based on the implementation. The processes are performed by interactions between multiple GenAI agents. In an embodiment, the at least one processor 204 may parse the user response data and the corresponding evidence data. The parsing may be performed using top-down parsing technique. A person skilled in the art will appreciate that any known parsing techniques other than the above-mentioned parsing technique may be used to parse the user response data and the corresponding evidence data. The at least one processor 204 may deconstruct the user response data into a first set of vectors. Further, the at least one processor 204 may deconstruct the corresponding evidence data into a second set of vectors. The deconstruction of the user response data and the corresponding evidence data may be performed by a first GenAI agent among the one or more GenAI agents. The at least one processor 204 may generate a combined vector by correlating the first set of vectors and the second set of vectors. The combined vector may represent a correlation between the user response data and the corresponding evidence data.

Referring to FIG. 5C, the at least one processor 204 correlates the user response data i.e., "bias was identified through oversampling underrepresented groups and debiasing algorithms were used" with the submitted evidence data. The user response data corresponds to identification and removal of bias in the training data of the AI model 104. The submitted evidence also shows a balance in number of data items used for two different classes (for example, male and female) during training the AI model 104. Accordingly, the correlation between the user response data and the evidence data is high. In another example illustrated in FIG. 5D, the user response data corresponds to identification and removal of bias in the training data of the AI model 104. The submitted evidence also shows an imbalance in number of data items used for two different classes (for example, male and female) during training the AI model 104. Accordingly, the correlation between the user response data and the evidence data is low. The user 102 may submit the evidence data by selecting an option "evidences" as shown in FIG. 5B.

In an embodiment, the at least one processor 204 compares the validated user response data with the preset response data corresponding to each of the plurality of questions. The preset response data may comprise predefined responses to the plurality of questions. In an example, the preset response data may be pre-defined by domain experts. For example, a response for identification of bias may be pre-defined by data analytics experts. In another example, a response for sensitizing data associated with the AI model 104 may be pre-defined by data privacy compliance teams. In an embodiment, a second GenAI agent among the one or more GenAI agents may compare the validated user response data with the preset response data. In an embodiment, the validated user response data may be compared with the preset response data by determining a distance metric between the validated user response data and the preset data response. Herein, the combined vector may be compared against an embedded vector corresponding to the preset response, and the distance metric may be determined. The comparison generates a contextual distance score. In an embodiment, the distance metric is determined using techniques such as Pointwise mutual information or cosine similarity. A person skilled in the art will appreciate that any other techniques may be used to determine the distance metric.

In an embodiment, the at least one processor 204 generates a report comprising a risk score indicating a risk associated with the AI model 104 corresponding to the risk parameter, using the learning model, based on the comparison. The risk score may be generated by a third GenAI agent among the one or more GenAI agents. The risk score corresponding to the risk parameter is generated based on a discrepancy between the combined vector and the embedded vector. When the discrepancy between the combined vector and the embedded vector is significant, it indicates a high risk score. The risk score is generated using the below equation:

$$R = \alpha \cdot d(v_{combined}, v_{embedded}) + \beta \qquad (1)$$

Where:

R is the continuous risk score.

α is a scaling factor that adjusts the sensitivity of the risk score to the distance.

β is an offset factor that ensures a baseline risk score.

$d(v_{combined}, v_{embedded})$ represents the contextual distance between the combined vector of evidence data and the user response data ($v_{combined}$) and the embedded vector associated with the preset response data ($v_{embedded}$).

$v_{combined} = f(vE, vA)$ is the combined vector of evidence data (vE) and the user response data (vA), obtained through a suitable combination function $f$.

To define the risk score R as a continuous value based on the given scenario, a mathematical representation to include a continuous risk assessment is refined. This process involves several steps, including vectorization, combination of vectors, comparison, and finally, risk scoring.

1. Vectorization:

Let E represent the evidence data and A the user response data provided by the user 102

The first GenAI agent vectorizes E into vE and A into vA.

2. Combination:

The vectors vE and vA are combined into a single vector $v_{combined}$. The combination may be a function $f$ that effectively merges the information contained in vE and vA, such as weighted sum, concatenation, or another method suitable for the context to result in $v_{combined} = f(VE, vA)$ 3. Comparison:

Let $v_{evidence}$ be the embedded vector.

The second GenAI agent calculates the contextual distance D between $v_{combined}$ and $v_{evidence}$ using a distance metric $D = d(v_{combined}, v_{embedded})$ 4. Risk Scoring:

The risk score R is a continuous value derived from the distance D. To transform D into a continuous risk score R, a function g may be used that maps D to a range of continuous values. This function may be linear or non-linear, depending on how sensitivity to distance changes is desired.

For simplicity, let's assume R is directly proportional to D, potentially modified by a scaling factor α to adjust sensitivity, and an offset β to ensure that R starts from a minimal risk score even when D is small. $R = g(D) = α·D + β$ Where:

vE and vA are the vector representations of evidence data and user response data, respectively.

$v_{combined}$ is the combined vector of evidence data and user response data.

$v_{embedded}$ is the embedded vector of preset response data.

D is the distance between $v_{combined}$ and $v_{embedded}$.

R is the continuous risk score.

α and β are constants to scale and offset the risk score R.

$f$ is the combination function for vE and vA.

d is the distance metric.

g is the function mapping distance to the risk score.

This formulation allows for a risk assessment, with R reflecting the degree of discrepancy between the combined vector of the evidence data and the user response data, and the preset response data in a continuous manner. Referring again to FIG. 4, the risk score may be generated at step 406. Referring again to the example of FIG. 5C, the preset response data to the question may be "Bias can be identified through statistical analysis and debiasing techniques. Regular audits and updates are essential for addressing evolving biases". The at least one processor 204 may correlate the user response data and the evidence data with the preset response data. The risk score generated may be 0.9 on a scale of 0 to 1. A person skilled in the art will appreciate that the scale of risk score may vary, and the above scale should not be considered as limiting. Referring to the example of FIG. 5D, the risk score generated may be 0.3 on a scale of 0.1 to 1, as there is an imbalance in the training data. As shown in FIG. 5B, the risk scores may be generated for each of the plurality of questions from which the risk score corresponding to the risk parameter may be generated.

In an embodiment, an adversarial attack to assess the risk associated with the AI model 104 may be generated upon receiving the selection from the user 102. The adversarial attack may be generated by a third GenAI among the one or more GenAI agents. The adversarial risk score corresponding to the adversarial attack may be determined in a similar way the risk score is generated for other risk parameters.

The at least one processor 204 may be configured to generate a report comprising the risk scores corresponding to the plurality of risk parameters. The report may be generated by a fourth GenAI agent among the one or more GenAI agents. The at least one processor 204 may communicate the report to an assessor, as shown in step 408 in FIG. 4. In an embodiment, the assessor may be a human and the assessment may be performed manually. In another embodiment, the assessor may be a GenAI bot which perform the assessment automatically. In yet another embodiment, the assessment may be partially manual and partially automatic. The assessor may assess non-compliance towards responsibleness based on the risk scores. In an example, the assessor may determine highest non-compliance and its impact, at step 410. The assessor may include feedback/ inputs into the risk assessment portal at step 412. Also, the assessor may provide the feedback to the user 102 at step 414. The user 102 may communicate with the assessor and take necessary mitigation measures at step 418.

Figure 5F:
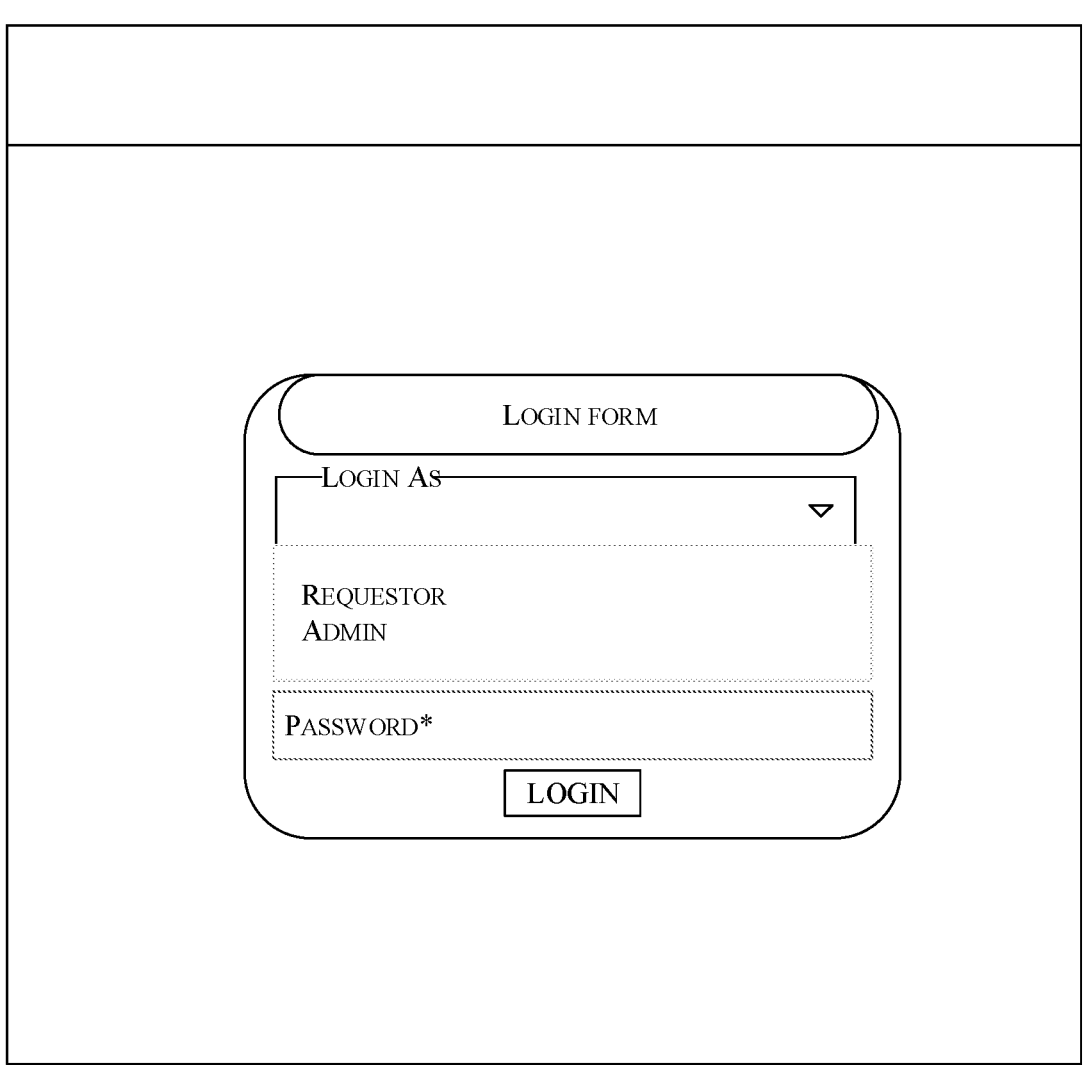

In an embodiment, the at least one processor 204 may generate one or more recommendations corresponding to at least one risk among the plurality of risk parameters, based on respective risk scores, using the learning model. The one or more recommendations may suggest actions for improving the risk score based on the analysis of discrepancies between the user response data and the preset response data. To achieve this, a fifth GenAI agent may analyze the components contributing to the high risk score, identifying specific areas where the discrepancies are most significant. The fifth GenAI agent may then recommend specific adjustments or additional information that the user must provide to align more closely with the characteristics of low-risk profiles. For instance, when the distance in certain vector dimensions is consistently linked to high-risk scores, the fifth GenAI agent may suggest enhancing those aspects of the evidence data or the user response data. In an example, providing of the one or more recommendations or guidance by the fifth GenAI agent may be implemented as virtual assistant as shown in FIG. 5A as "conversation with AI". The user 102 may view the one or more recommendations/ suggestions by selecting an option "suggestion" as shown in FIG. 5B. As shown in FIG. 5F, the risk assessment portal may be accessed by the user 102 or admin or the assessor.

Figure 3:
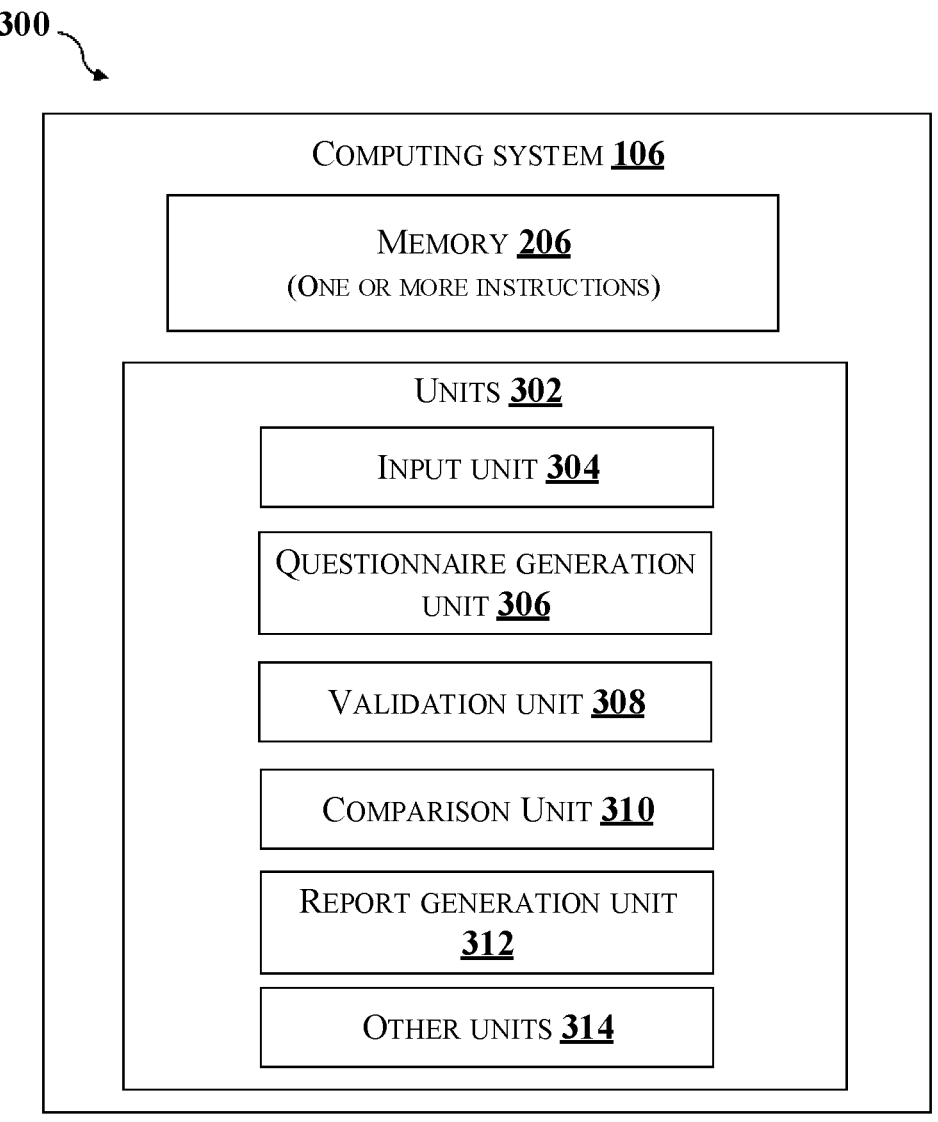

In an embodiment of the present disclosure, the computing system 106 may comprise various units or means as shown in FIG. 3. The units 302 may comprise an input unit 304, a questionnaire generation unit 306, a validation unit 308, a comparison unit 310, a report generation unit 312, and other units 314. In an embodiment, the units 304-314 may be dedicated hardware units capable of executing one or more instructions stored in the memory 206 for performing various operations of the computing system 106. In another embodiment, the units 304-314 may be software modules stored in the memory 206 which may be executed by the at least one processor 204 for performing the operations of the computing system 106.

FIG. 6 shows an exemplary flow chart illustrating method steps for assessing the risk associated with the AI models, in accordance with some embodiments of the present disclosure. As illustrated in FIG. 6, the method 600 may comprise one or more steps. The method 500 may be described in the general context of computer executable instructions. Generally, computer executable instructions can include routines, programs, objects, components, data structures, procedures, modules, and functions, which perform particular functions or implement particular abstract data types.

The order in which the method 600 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 602, the method may include receiving the risk parameter among the plurality of risk parameters used for assessing the AI model 104, from a user associated with the AI model. The operations of block 602 may be performed by the at least one processor 204 (of FIG. 2) or the input unit 304 (of FIG. 3) and corresponding data may be stored as input data 208 in the memory 206.

At block 604, the method may include generating the preset questionnaire comprising the plurality of questions corresponding to the risk parameter. The operations of block 604 may be performed by the at least one processor 204 (of FIG. 2) or the questionnaire generation unit 306 (of FIG. 3) and corresponding data may be stored as questionnaire data 210 in the memory 206.

At block 606, the method may include receiving user response data and corresponding evidence data against each of the plurality of questions from the user. The operations of block 602 may be performed by the at least one processor 204 (of FIG. 2) or the input unit 304 (of FIG. 3) and corresponding data may be stored as the input data 208 in the memory 206.

At block 608, the method may include validating the user response data by correlating the user response data with the corresponding evidence data. The operations of block 608 may be performed by the at least one processor 204 (of FIG. 2) or the validation unit 308 (of FIG. 3) and corresponding data may be stored as validation data 212 in the memory 206.

At block 610, the method may include comparing the validated user response data with preset response data corresponding to each of the plurality of questions. The operations of block 610 may be performed by the at least one processor 204 (of FIG. 2) or the comparison unit 310 (of FIG. 3) and corresponding data may be stored as comparison data 214 in the memory 206.

At block 612, the method may include generating the report comprising the risk score indicating a risk associated with the AI model 104 corresponding to the risk parameter, using a learning model, based on the comparison. The operations of block 612 may be performed by the at least one processor 204 (of FIG. 2) or the report generation unit 312 (of FIG. 3) and corresponding data may be stored as report generation data 216 in the memory 206.

FIG. 7 illustrates a block diagram of an exemplary computer system 700 for implementing embodiments consistent with the present disclosure. In an embodiment, the computer system 700 may be used to implement the computing system 106. Thus, the computer system 700 may be used for assessing the risk associated with the AI models. The computer system 700 may communicate with the user 102 over the communication network 718. The computer system 700 may comprise a Central Processing Unit 704 (also referred as "CPU" or "processor"). The processor 704 may comprise at least one data processor. The processor 704 may include specialized processing units such as integrated system (bus) controllers, memory management control units, floating point units, graphics processing units, digital signal processing units, etc.

The processor 704 may be disposed in communication with one or more input/output (I/O) devices (not shown) via I/O interface 702. The I/O interface 702 may employ communication protocols/methods such as, without limitation, audio, analog, digital, monoaural, RCA, stereo, IEEE (Institute of Electrical and Electronics Engineers)-1394, serial bus, universal serial bus (USB), infrared, PS/2, BNC, coaxial, component, composite, digital visual interface (DVI), high-definition multimedia interface (HDMI), Radio Frequency (RF) antennas, S-Video, VGA, IEEE 716.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 702, the computer system 700 may communicate with one or more I/O devices. For example, the input device 720 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 722 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 704 may be disposed in communication with the communication network 718 via a network interface 706. The network interface 706 may communicate with the communication network 718. The network interface 706 may employ connection protocols including, without limitation, direct connect, Ethernet (e.g., twisted pair 10/100/1000 Base T), transmission control protocol/internet protocol (TCP/IP), token ring, IEEE 716.11a/b/g/n/x, etc. The communication network 718 may include, without limitation, a direct interconnection, local area network (LAN), wide area network (WAN), wireless network (e.g., using Wireless Application Protocol), the Internet, etc. The network interface 706 may employ connection protocols include, but not limited to, direct connect, Ethernet (e.g., twisted pair 10/100/1000 Base T), transmission control protocol/internet protocol (TCP/IP), token ring, IEEE 716.11a/b/g/n/x, etc.

The communication network 718 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 704 may be disposed in communication with a memory 710 (e.g., RAM, ROM, etc. not shown in FIG. 7) via a storage interface 708. The storage interface 708 may connect to memory 710 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 710 may store a collection of program or database components, including, without limitation, user interface 712, an operating system 714, web browser 716 etc. In some embodiments, computer system 700 may store user/application data, such as, the data, variables, records, etc., as described in this disclosure. Such databases may be implemented as fault-tolerant, relational, scalable, secure databases such as Oracle® or Sybase®.

The operating system 714 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/7, 10 etc.), APPLE® IOS™ GOOGLER ANDROID™, BLACKBERRY® OS, or the like.

In some embodiments, the computer system 700 may implement the web browser 716 stored program component. The web browser 716 may be a hypertext viewing application, for example MICROSOFT® INTERNET EXPLORER™, GOOGLER CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 716 may utilize facilities such as AJAX™, DHTML™, ADOBE® FLASH™, JAVASCRIPT™, JAVA™, Application Programming Interfaces (APIs), etc. In some embodiments, the computer system 700 may implement a mail server (not shown in Figure) stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 700 may implement a mail client stored program component. The mail client (not shown in Figure) may be a mail viewing application, such as APPLER MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, Compact Disc Read-Only Memory (CD ROMs), Digital Video Disc (DVDs), flash drives, disks, and any other known physical storage media.

The present disclosure provides methods and systems for assessing risk associated with Artificial Intelligence (AI) models. The present disclosure provides a system where a user associated with an AI model can assess risks associated with the AI model. The system generates risk scores indicating risks associated with the AI models corresponding to various risk parameters. Also, the system of the present disclosure assesses the non-compliance of the AI models for various risk parameters based on the risk scores and provides recommendations/guidance or to lower the risk scores. Accordingly, the users associated with the AI models can take necessary mitigation measures to reduce risks associated with the AI models and develop a responsible AI model. The system of the present disclosure validates the response provided by the user based on the evidence data, and hence enables a robust assessment process of the AI models.

The present disclosure provides a structured approach to assess the AI models, ensuring fairness, privacy, security, and compliance. The system of the present disclosure empowers users associated with the AI models to identify biases, mitigate risks, ensure legal and ethical compliance, and optimize model performance. The framework of the present disclosure fosters transparency, enabling explainability and interpretability crucial for building trust in the AI models. By emphasizing continuous monitoring and improvement, the present disclosure enables resilient models that generalize well, minimizing harm, and aligning with evolving societal expectations. The system of the present disclosure enables development of the AI models that are robust against adversarial attacks. Also, the present disclosure facilitates informed decision making, fostering responsible AI development and deployment. The continuous monitoring of the AU model allows timely adaptations and improvements, enhancing overall model performance and alignment with evolving ethical and legal standards. The framework of the present disclosure enables organizations to build trustworthy AI systems, inspiring confidence, regulatory adherence, and societal benefit while minimizing potential risks.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 6 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method of assessing risk associated with Artificial Intelligence (AI) models, the method comprising:

receiving, by at least one processor, a risk parameter among a plurality of risk parameters used for assessing an AI model, from a user associated with the AI model;

retrieving, by the at least one processor, from questionnaire data stored based on an analysis of the risk parameter, a preset questionnaire comprising a plurality of questions corresponding to the risk parameter;

receiving, by at least one processor, user response data and corresponding evidence data against each of the plurality of questions from the user;

parsing, by the at least one processor, the user response data and the corresponding evidence data to generate parsed user response data and parsed evidence data;

deconstructing, by the at least one processor, the parsed user response data into a first set of vectors and the parsed evidence data into a second set of vectors;

generating a combined vector by correlating the first set of vectors and the second set of vectors, wherein the combined vector represents a correlation between the first set of vectors and the second set of vectors;

determining a distance metric between the combined vector and an embedded vector corresponding to preset response data corresponding to each of the plurality of questions; and generating a risk score indicating a risk associated with the AI model corresponding to the risk parameter based on the determined distance metric.

2. The method of claim 1, wherein the first set of vectors and the second set of vectors are determined by a first Generative AI (GenAI) agent, wherein the distance metric is determined by a second GenAI model, wherein the risk score is generated by a third GenAI agent.

3. The method of claim 1, wherein determining the distance metric between the combined vector and the embedded vector, comprising:

determining a contextual distance metric between the combined vector and the embedded vector.

4. The method of claim 1, comprising:

analyzing, using a fifth GenAI agent, the distance metric associated with the combined vector and the embedding vector pertaining to the risk score; and generating, using the fifth GenAI agent, one or more recommendations corresponding to at least one risk among the plurality of risk parameters, based on the analysis.

5. The method of claim 1, comprising:

generating, by the third GenAI agent, an adversarial attack to assess the risk associated with the AI model; and determining, by the third GenAI agent, an adversarial risk score corresponding to the adversarial attack.

6. The method of claim 1, comprising:

generating, by a fourth GenAI agent, a report comprising risk scores corresponding to the plurality of risk parameters.

7. A computing system for assessing risk associated with Artificial Intelligence (AI) models, the computing system comprising:

at least one processor; and a memory, wherein the memory stores processor-executable instructions, which, on execution, causes the processor to:

receive a risk parameter among a plurality of risk parameters used for assessing an AI model, from a user associated with the AI model;

retrieve, from questionnaire data stored based on an analysis of the risk parameter, a preset questionnaire comprising a plurality of questions corresponding to the risk parameter;

receive user response data and corresponding evidence data against each of the plurality of questions from the user;

parse the user response data and the corresponding evidence data to generate parsed user response data and parsed evidence data;

deconstruct the parsed user response data into a first set of vectors and the parsed evidence data into a second set of vectors;

generate a combined vector by correlating the first set of vectors and the second set of vectors, wherein the combined vector represents a correlation between the first set of vectors and the second set of vectors;

determine a distance metric between the combined vector and an embedded vector corresponding to preset response data corresponding to each of the plurality of questions; and generate a risk score indicating a risk associated with the AI model corresponding to the risk parameter based on the determined distance metric.

8. The computing system of claim 7, wherein the first set of vectors and the second set of vectors are determined by a first Generative AI (GenAI) agent, wherein the distance metric is determined by a second GenAI model, wherein the risk score is generated by a third GenAI agent.

9. The computing system of claim 7, wherein the at least one processor is configured to determine the distance metric between the combined vector and the embedded vector by:

determining a contextual distance between the combined vector and the embedded vector.

10. The computing system of claim 7, wherein the at least one processor is configured to:

analyze, using a fifth GenAI agent, the distance metric associated with the combined vector and the embedding vector pertaining to the risk score; and generate, using the fifth GenAI agent, one or more recommendations corresponding to at least one risk among the plurality of risk parameters, based on the analysis.

11. The computing system of claim 7, wherein the at least one processor is configured to:

generate, by the third GenAI agent, an adversarial attack to assess the risk associated with the AI model; and determine, by the third GenAI agent, an adversarial risk score corresponding to the adversarial attack.

12. A non-transitory computer readable media comprising instructions, when executed by at least one processor, cause the at least one processor to:

receive a risk parameter among a plurality of risk parameters used for assessing an AI model, from a user associated with the AI model;

retrieve, from questionnaire data stored based on an analysis of the risk parameter, a preset questionnaire comprising a plurality of questions corresponding to the risk parameter;

receive user response data and corresponding evidence data against each of the plurality of questions from the user;

parse the user response data and the corresponding evidence data to generate parsed user response data and parsed evidence data;

deconstruct the parsed user response data into a first set of vectors and the parsed evidence data into a second set of vectors;

generate a combined vector by correlating the first set of vectors and the second set of vectors, wherein the combined vector represents a correlation between the first set of vectors and the second set of vectors;

determine a distance metric between the combined vector and an embedded vector corresponding to preset response data corresponding to each of the plurality of questions; and generate a risk score indicating a risk associated with the AI model corresponding to the risk parameter, using a learning model, based on the determined distance metric.

* * * * *